(12) United States Patent
Ogasahara

(10) Patent No.: US 9,055,181 B2
(45) Date of Patent: Jun. 9, 2015

(54) SOLID-STATE IMAGING DEVICE, IMAGE PROCESSING APPARATUS, AND A CAMERA MODULE HAVING AN IMAGE SYNTHESIZER CONFIGURED TO SYNTHESIZE COLOR INFORMATION

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 374 days.

(21) Appl. No.: 13/419,706

(22) Filed: Mar. 14, 2012

(65) Prior Publication Data

US 2013/0016251 A1 Jan. 17, 2013

(30) Foreign Application Priority Data

Jul. 15, 2011 (JP) .................................. 2011-156757

(51) Int. Cl.
*H04N 9/04* (2006.01)
*H04N 5/225* (2006.01)
*H04N 9/09* (2006.01)

(52) U.S. Cl.
CPC .............. *H04N 9/045* (2013.01); *H04N 5/2257* (2013.01); *H04N 5/2258* (2013.01); *H04N 9/09* (2013.01)

(58) Field of Classification Search
USPC .................. 348/236, 238, 262–265
See application file for complete search history.

(56) References Cited

U.S. PATENT DOCUMENTS

| 6,614,471 B1* | 9/2003 | Ott ................................ 348/238 |
| 7,782,364 B2* | 8/2010 | Smith ......................... 348/218.1 |
| 2008/0151079 A1* | 6/2008 | Iijima et al. ................... 348/241 |
| 2008/0303927 A1* | 12/2008 | Khanh .......................... 348/262 |

FOREIGN PATENT DOCUMENTS

| JP | 63-155893 | 6/1988 |
| JP | 2001-36809 | 2/2001 |
| JP | 2002-354492 | 12/2002 |
| JP | 2004-328737 | 11/2004 |
| JP | 2007-235862 | 9/2007 |
| JP | 2008-524924 | 7/2008 |
| JP | 2008-526062 | 7/2008 |
| JP | 2008-258430 | 10/2008 |

(Continued)

OTHER PUBLICATIONS

U.S. Appl. No. 13/750,124, filed Jan. 25, 2013, Ogasahara.

(Continued)

*Primary Examiner* — Albert Cutler
(74) *Attorney, Agent, or Firm* — Oblon, McClelland, Maier & Neustadt, L.L.P.

(57) ABSTRACT

According to one embodiment, a solid-state imaging device includes a first image sensor, a second image sensor, and an image pickup processing circuit. The first image sensor is configured to output a first image signal according to an intensity distribution of each of color lights from an object. The second image sensor is configured to output a second image signal according to a luminance distribution of the light from the object. The image pickup processing circuit includes an image synthesizer. The image synthesizer is configured to synthesize color information included in the first image signal and luminance information included in the second image signal.

17 Claims, 12 Drawing Sheets

(56) References Cited

FOREIGN PATENT DOCUMENTS

| | | |
|---|---|---|
| JP | 2009-17544 | 1/2009 |
| JP | 2010-288150 | 12/2010 |
| JP | 2011-44801 | 3/2011 |
| WO | 2006/069886 A1 | 7/2006 |
| WO | 2007/013250 A1 | 2/2007 |

OTHER PUBLICATIONS

Office Action mailed Sep. 24, 2014 in Japanese Application No. 2011-156757 filed Jul. 15, 2011 (w/English translation).
Office Action issued Mar. 10, 2015 in Japanese Patent Application No. 2011-156757 (with English translation).

* cited by examiner

FIG.8

| R | G1 | R |
|---|----|---|
| G4 | B | G2 |
| R | G3 | R |

FIG.9

| B | G1 | B |
|---|----|---|
| G4 | R | G2 |
| B | G3 | B |

FIG.10

| | SECOND LUMINANCE INFORMATION (MONOCHROMATIC IMAGE SENSOR) | FIRST LUMINANCE INFORMATION (COLOR IMAGE SENSOR) |
|---|---|---|
| TYPE 1 | W W W W / W W W W / W W W W / W W W W | G G G G / G G G G / G G G G / G G G G |
| TYPE 2 | G G G G / G G G G / G G G G / G G G G | G G G G / G G G G / G G G G / G G G G |
| TYPE 3 | G G G G / G G G G / G G G G / G G G G | R R R R / R R R R / R R R R / R R R R  +  B B B B / B B B B / B B B B / B B B B |
| TYPE 4 | G G G G / G G G G / G G G G / G G G G | C C C C / C C C C / C C C C / C C C C  +  Y Y Y Y / Y Y Y Y / Y Y Y Y / Y Y Y Y |

FIG.11

| B | R | B | R |
|---|---|---|---|
| R | B | R | B |
| B | R | B | R |
| R | B | R | B |

FIG.12

| C | Y | C | Y |
|---|---|---|---|
| Y | C | Y | C |
| C | Y | C | Y |
| Y | C | Y | C |

FIG.13

|    | C1 |    |
|----|----|----|
| C4 | Y  | C2 |
|    | C3 |    |

FIG.14

|    | Y1 |    |
|----|----|----|
| Y4 | C  | Y2 |
|    | Y3 |    |

SOLID-STATE IMAGING DEVICE, IMAGE PROCESSING APPARATUS, AND A CAMERA MODULE HAVING AN IMAGE SYNTHESIZER CONFIGURED TO SYNTHESIZE COLOR INFORMATION

CROSS-REFERENCE TO RELATED APPLICATIONS

This application is based upon and claims the benefit of priority from Japanese Patent Application No. 2011-156757, filed on Jul. 15, 2011; the entire contents of which are incorporated herein by reference.

FIELD

The present embodiments typically relates to a solid-state imaging device, an image processing apparatus, and a camera module.

BACKGROUND

A solid-state imaging device may conventionally adopt the measures for enlarging a pixel, for example, in order to pick up an image with a high sensitivity. In the case where the size of an image sensor is increased due to the enlargement of the pixel, a long distance from a lens to a light receiving surface (a focal distance) is secured, thereby making it difficult to reduce the thickness of a camera module.

Most image sensors adopt the Bayer matrix in which a red (R) pixel and a blue (B) pixel are arranged on one diagonal line in a pixel block of a 2×2 matrix whereas two green (G) pixels are arranged on the other diagonal line. There has been conventionally proposed an image sensor in which one of G pixels in a pixel block of a 2×2 matrix is replaced with a white (W) pixel in order to pick up an image with a high sensitivity. The W pixel captures a white light. The W pixel is arranged so as to sufficiently secure the signal electric charge amount of a luminance signal.

The W pixel captures a light at a wider wavelength range than those of the other color pixels, and therefore, saturation of an output with respect to an intensity of a light incident into a pixel cell occurs earlier than in the other color pixels. Since the output with respect to the intensity of the incident light is saturated in the W pixel, the image sensor provided with the W pixel may achieve a satisfactory sensitivity with respect to each of colors. Moreover, many lights are captured into the W pixel, and therefore, a crosstalk is liable to occur in the W pixel because the light leaks out to the other color pixels adjacent to the W pixel. The image sensor provided with the W pixel has experienced the problem of degradation of color reproducibility caused by the crosstalk.

BRIEF DESCRIPTION OF THE DRAWINGS

FIGS. 8 and 9 are diagrams explanatory of generation of first luminance information in a color signal separator;

FIG. 10 is a table explanatory of a modification in which synthesized luminance information is acquired by synthesizing the first luminance information and second luminance information;

FIG. 11 is a diagram explanatory of a matrix of pixels in a color image sensor used in Type 3;

FIG. 12 is a diagram explanatory of a matrix of pixels in a color image sensor used in Type 4;

FIG. 13 is a diagram explanatory of calculation of a signal value of a C component with respect to a Y pixel;

FIG. 14 is a diagram explanatory of calculation of a signal value of a Y component with respect to a C pixel;

DETAILED DESCRIPTION

According to one embodiment, a solid-state imaging device includes a first image sensor, a second image sensor, and an image pickup processing circuit. The first image sensor is designed to output a first image signal corresponding to an intensity distribution of each of color lights from an object. The second image sensor is designed to output a second image signal corresponding to a luminance distribution of the light from the object. The image pickup processing circuit processes the first image signal and the second image signal. The image pickup processing circuit includes an image synthesizer. The image synthesizer is adapted to synthesize color information included in the first image signal and luminance information included in the second image signal.

A solid-state imaging device, an image processing apparatus, and a camera module according to the embodiment will be explained in detail below with reference to the accompanying drawings. The present invention is not limited to the embodiment.

Figure 1:
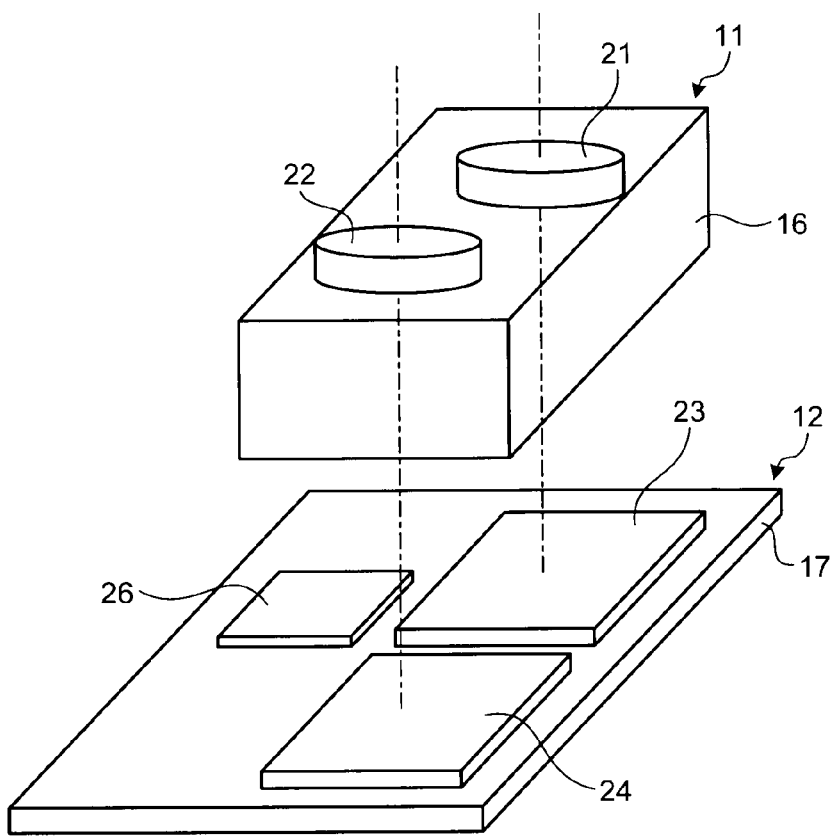
FIG. 1 is a perspective view schematically showing the partial configuration of a camera module, to which a solid-state imaging device is applied, in an embodiment.
Figure 2:
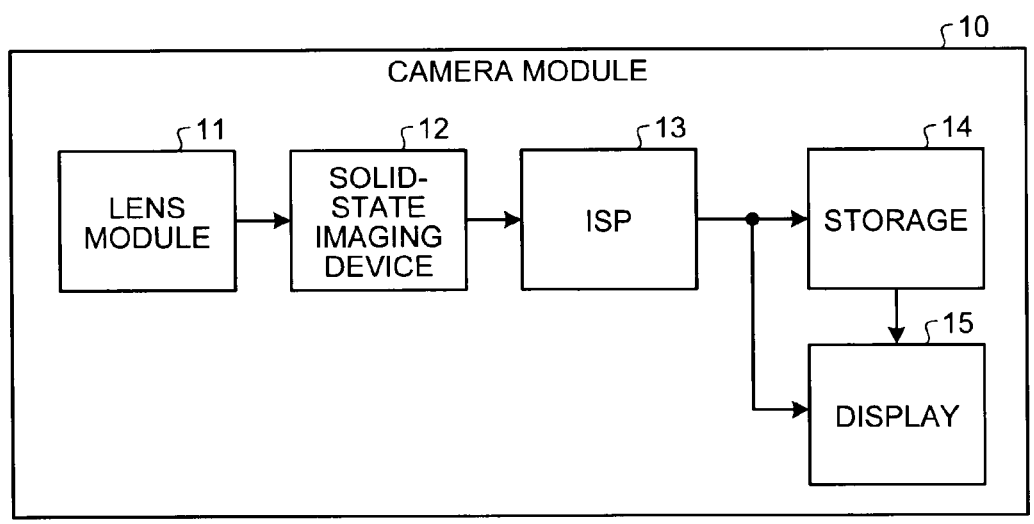
FIG. 2 is a block diagram illustrating the schematic configuration of the camera module.

FIG. 1 is a perspective view schematically showing the partial configuration of a camera module, to which the solid-state imaging device is applied, in the embodiment. FIG. 2 is a block diagram illustrating the schematic configuration of the camera module. A camera module 10 includes a lens module 11, a solid-state imaging device 12, an image signal processor (abbreviated as an "ISP") 13, a storage 14, and a display 15.

The lens module 11 captures a light from an object, so as to form an image of the object. The solid-state imaging device 12 picks up the image of the object. The ISP 13 processes an image signal obtained by picking up the image in the solid-state imaging device 12. The storage 14 stores therein the image which has been subjected to the signal processing in the ISP 13. The storage 14 outputs an image signal to the display 15 according to operation or the like by a user. The display 15 displays an image in response to the image signal received from the ISP 13 or the storage 14. Here, the display 15 is, for example, a liquid crystal display.

Figure 3:
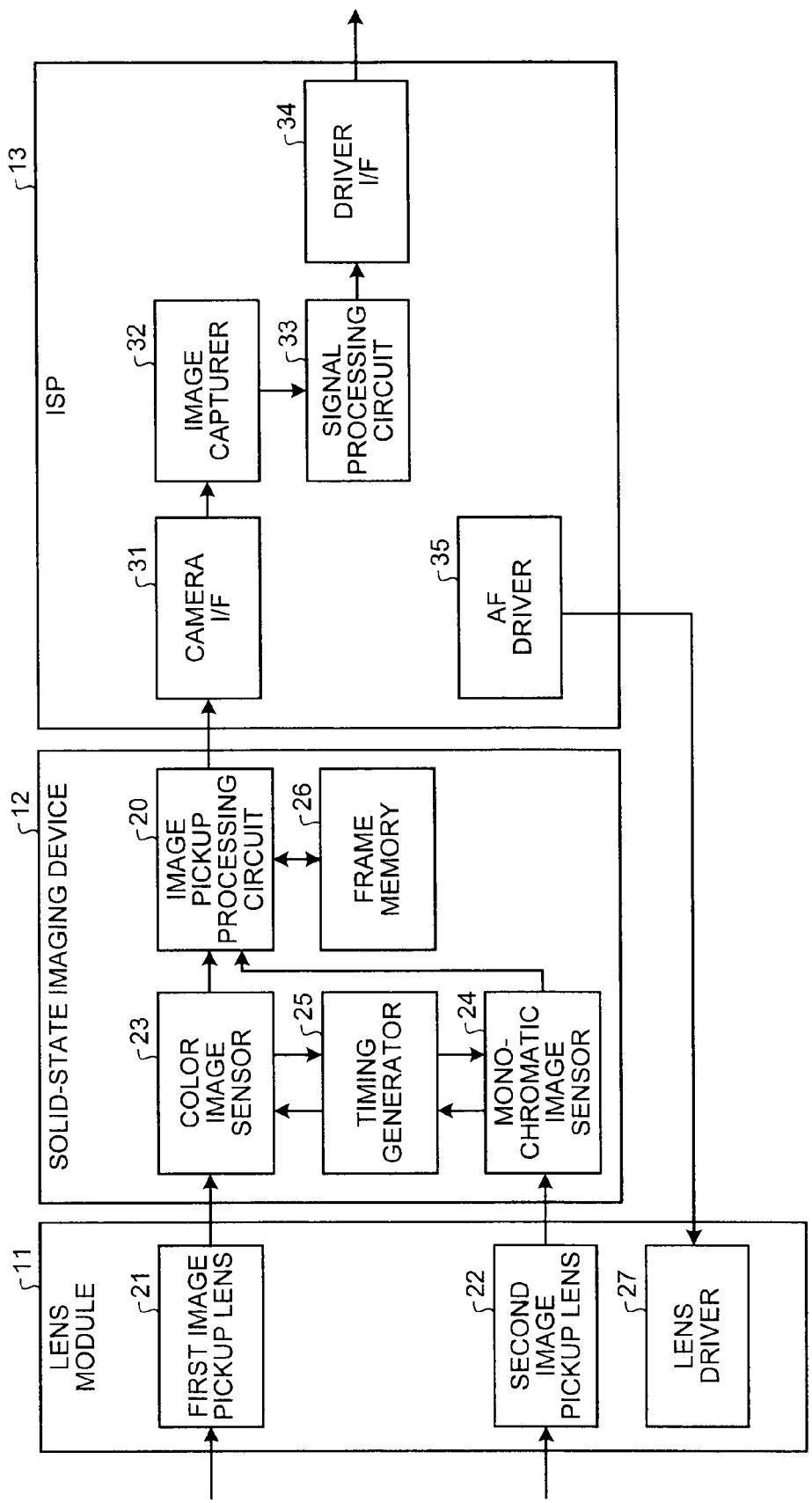
FIG. 3 is a block diagram illustrating, in detail, a lens module, the solid-state imaging device, and an ISP.
Figure 4:
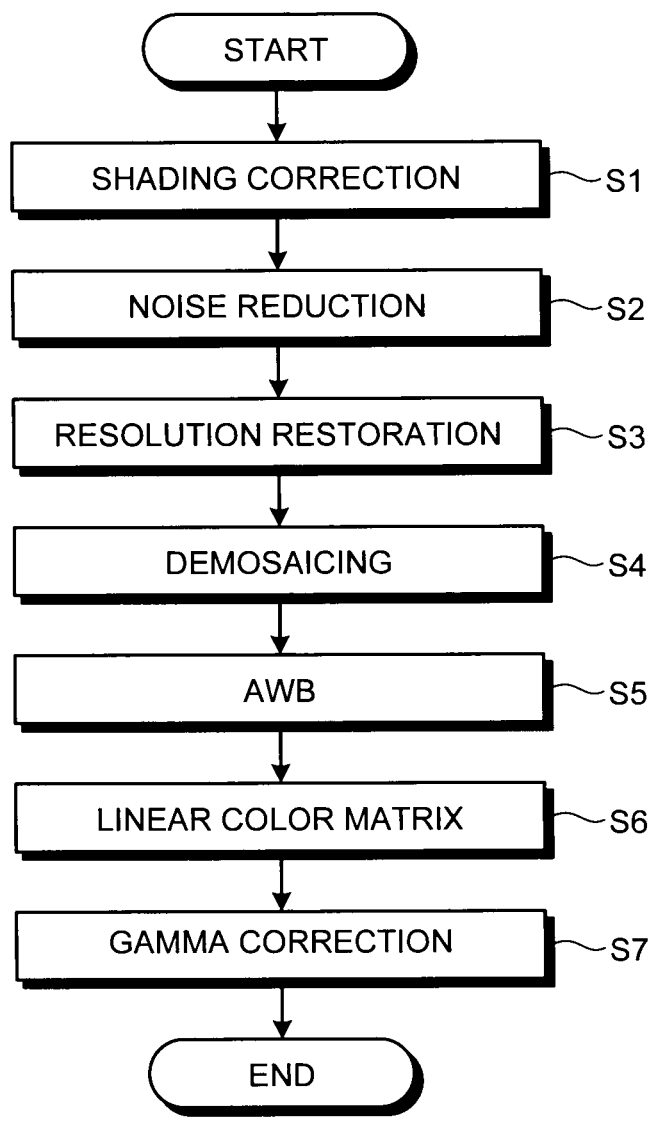
FIG. 4 is a flowchart explanatory of signal processing procedures by a signal processing circuit in the ISP.

FIG. 3 is a block diagram illustrating, in detail, the lens module, the solid-state imaging device, and the ISP. FIG. 4 is a flowchart explanatory of signal processing procedures by the signal processing circuit in the ISP. As illustrated in FIG. 3, the lens module 11 includes a first image pickup lens 21, a second image pickup lens 22, and a lens driver 27. The first image pickup lens 21 captures the light from the object, and then, inputs it into a color image sensor 23. In contrast, the second image pickup lens 22 captures the light from the object, and then, inputs it into a monochromatic image sensor 24.

As shown in FIG. 1, the first image pickup lens 21 and the second image pickup lens 22 are fixed to a common lens holder 16. The first image pickup lens 21 and the second image pickup lens 22 are held in, for example, a lens barrel while being fixed to the lens holder 16. The first image pickup lens 21 and the second image pickup lens 22 are arranged in a direction perpendicular to the optical axis of the first image pickup lens 21 and the optical axis of the second image pickup lens 22, as indicated by alternate long and short dashed lines in FIG. 1.

The solid-state imaging device 12 includes an image pickup processing circuit 20, the color image sensor 23, the monochromatic image sensor 24, a timing generator 25, and a frame memory 26. In the color image sensor 23 are arranged an R pixel for detecting an R light, a G pixel for detecting a G light, and a B pixel for detecting a B light in, for example, the Bayer matrix. The color image sensor 23 functions as a first image sensor for outputting RAW image data. The RAW image data signifies a first image signal according to an intensity distribution of each of color lights captured by the first image pickup lens 21.

In contrast, in the monochromatic image sensor 24 are arrayed W pixels for detecting a W light. The monochromatic image sensor 24 functions as a second image sensor for outputting monochromatic image data. The monochromatic image data signifies a second image signal according to a luminance distribution of the lights captured by the second image pickup lens 22. The color image sensor 23 and the monochromatic image sensor 24 adopt a transmission system of LVDS (abbreviating "low voltage differential signaling"), for example.

The image pickup processing circuit 20 processes the RAW image data output from the color image sensor 23 and the monochromatic image data output from the monochromatic image sensor 24. The image pickup processing circuit 20 outputs synthetic image data obtained by synthesizing the RAW image data and the monochromatic image data. The frame memory 26 stores therein at least either of the RAW image data and the monochromatic image data input into the image pickup processing circuit 20. The frame memory 26 is used for parallax correction, described later, and further, it may be used for high dynamic range (abbreviated as "HDR") processing, hand shaking correction, or the like.

As shown in FIG. 1, the color image sensor 23, the monochromatic image sensor 24, and the frame memory 26 are mounted on a common printed board 17. The first image pickup lens 21 is disposed opposite to the color image sensor 23. In contrast, the second image pickup lens 22 is disposed opposite to the monochromatic image sensor 24.

The camera module 10 has a configuration suitable for miniaturization by integrating the color image sensor 23, the monochromatic image sensor 24, and the frame memory 26 on the common printed board 17. The timing generator 25 generates a frame timing applied to both of RAW image data and monochromatic image data.

Figure 5:
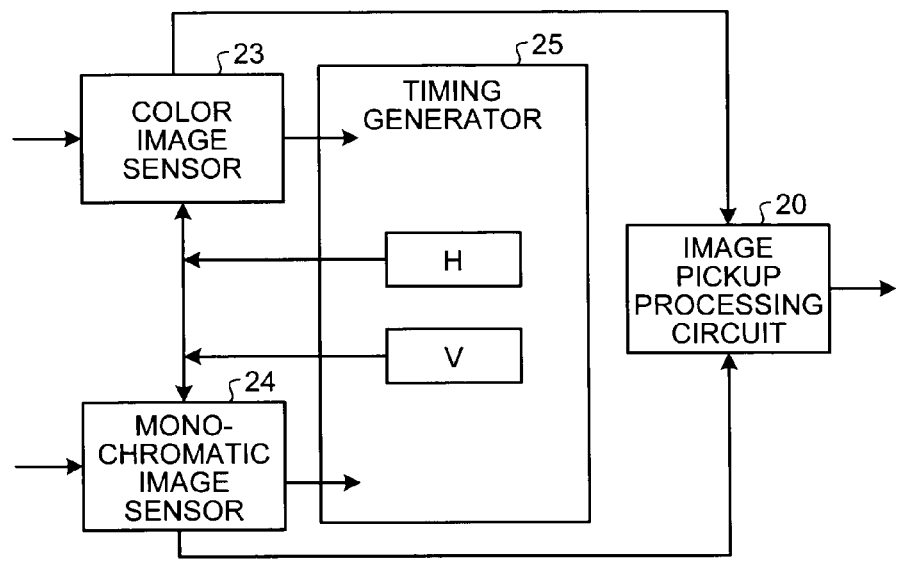
FIG. 5 is a block diagram explanatory of adjustment of a frame timing in a timing generator.

FIG. 5 is a block diagram explanatory of adjustment of the frame timing in the timing generator. The timing generator 25 generates a horizontal synchronous signal H and a vertical synchronous signal V. The color image sensor 23 allows the frame timing to accord with the horizontal synchronous signal H and the vertical synchronous signal V, and then, outputs the RAW image data. In contrast, the monochromatic image sensor 24 allows the frame timing to accord with the horizontal synchronous signal H and the vertical synchronous signal V, and then, outputs the monochromatic image data.

Figure 6:
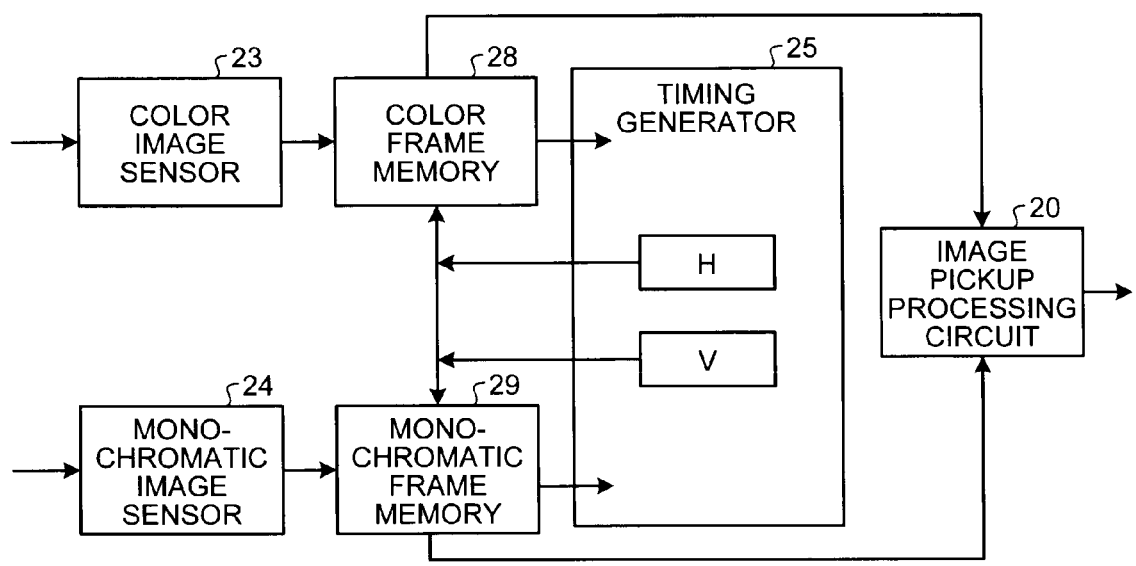
FIG. 6 is a block diagram explanatory of the adjustment of the frame timing using a frame memory.

FIG. 6 is a block diagram explanatory of the adjustment of the frame timing using a frame memory. A color frame memory 28 temporarily stores therein the RAW image data output from the color image sensor 23. In contrast, a monochromatic frame memory 29 temporarily stores therein the monochromatic image data output from the monochromatic image sensor 24. Here, the color frame memory 28 and the monochromatic frame memory 29 are designed to be included in, for example, the frame memory 26 (see FIG. 3).

The color frame memory 28 allows the frame timing of the RAW image data stored therein to accord with the horizontal synchronous signal H and the vertical synchronous signal V, and then, outputs the RAW image data. In contrast, the monochromatic frame memory 29 allows the frame timing of the monochromatic image data stored therein to accord with the horizontal synchronous signal H and the vertical synchronous signal V, and then, outputs the monochromatic image data. The solid-state imaging device 12 may adjust the frame timing by either one of the configurations illustrated in FIGS. 5 and 6.

As illustrated in FIG. 3, the ISP 13 includes a camera interface (I/F) 31, an image capturer 32, a signal processing circuit 33, a driver interface (I/F) 34, and an auto focus (AF) driver 35. The camera I/F 31 receives an input of synthetic image data from the solid-state imaging device 12. The image capturer 32 captures the synthetic image data which has been input into the camera I/F 31.

The signal processing circuit 33 processes a signal with respect to a synthetic image captured in the image capturer 32. The driver I/F 34 outputs the image data, which has been subjected to the signal processing in the signal processing circuit 33, to the storage 14 and the display 15 (see FIG. 1).

In the procedure of the signal processing illustrated in FIG. 4, the signal processing circuit 33 subjects the image captured in the image capturer 32 to shading correction (step S1). The signal processing circuit 33 corrects a luminance unevenness caused by an intensity difference between the center and the periphery by the shading correction with respect to the first image pickup lens 21 and the second pickup lens 22.

The signal processing circuit 33 performs noise reduction for eliminating noises such as a fixed pattern noise, a dark current noise, and a shot noise (step S2) and resolution restoration (step S3). Next, the signal processing circuit 33 subjects a digital image signal, which is transmitted in order in the Bayer matrix, to pixel interpolation (demosaicing) (step S4). In the demosaicing process, a sensitive level value of a short color component is produced by interpolating the image signal obtained by picking up the image. The signal processing circuit 33 synthesizes color bit map images by the demosaicing.

The signal processing circuit 33 subjects the color image to automatic white balance control (abbreviated as "AWB") (step S5). Moreover, the signal processing circuit 33 performs linear color matrix processing for the purpose of color reproducibility (step S6) and gamma correction for correcting chroma or brightness of the image to be displayed on the display or the like (step S7). Here, the procedures of the signal processing in the signal processing circuit 33 which is explained in the present embodiment are merely one example, and therefore, other processing may be appropriately added, processing which can be omitted may be appropriately omitted, or the order may be appropriately changed.

The signal processing in the camera module 10 is performed by mainly the image pickup processing circuit 20 in the former stage and the ISP 13 in the latter stage. In the camera module 10, the image pickup processing circuit 20 and the ISP 13 function as an image processing apparatus for processing the image signals captured by the color image sensor 23 and the monochromatic image sensor 24.

The AF driver 35 controls the lens driver 27. The lens driver 27 drives the first image pickup lens 21 and the second image pickup lens 22 in the direction of the optical axes so as to adjust the focuses of the first image pickup lens 21 and the second image pickup lens 22. The lens driver 27 moves the lens holder 16 so as to drive the first image pickup lens 21 and the second image pickup lens 22 together. In the camera module 10, since the first image pickup lens 21 and the second image pickup lens 22 can be driven together, the lens module 11 can have a simpler configuration than in the case where the first image pickup lens 21 and the second image pickup lens 22 are individually driven.

Figure 7:
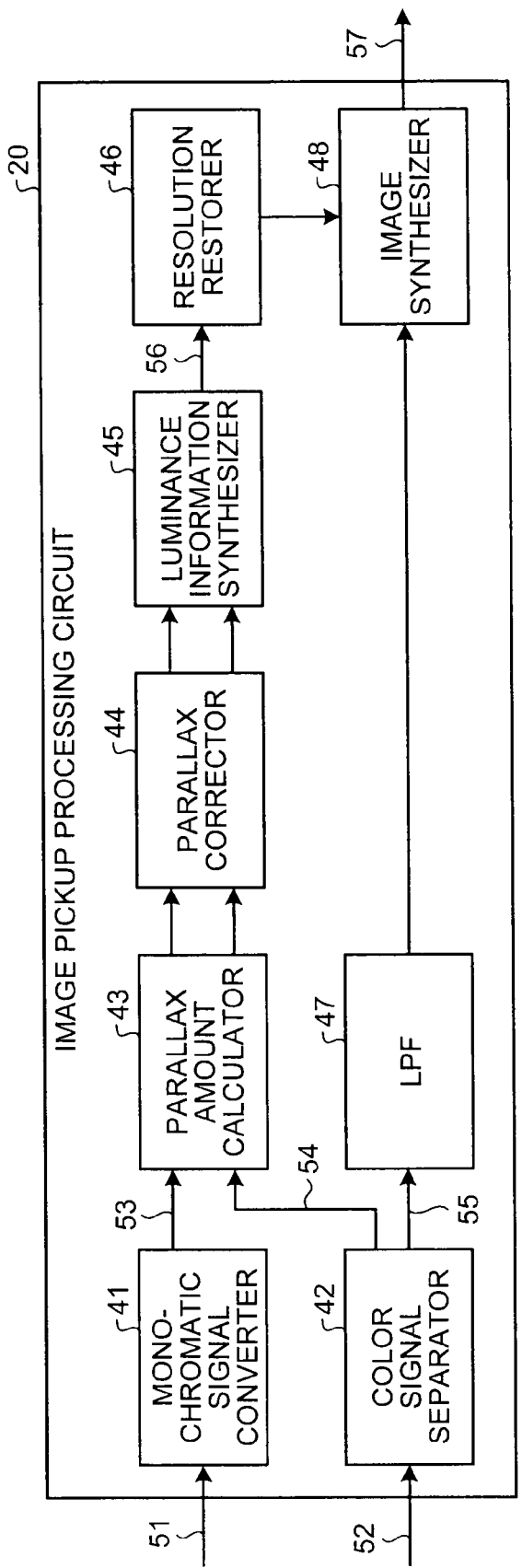
FIG. 7 is a block diagram illustrating the details of an image pickup processing circuit.

FIG. 7 is a block diagram illustrating the details of the image pickup processing circuit. The image pickup processing circuit 20 includes a monochromatic signal converter 41, a color signal separator 42, a parallax amount calculator 43, a parallax corrector 44, a luminance information synthesizer 45, a resolution restorer 46, a low pass filter (abbreviated as an "LPF") 47, and an image synthesizer 48.

The monochromatic signal converter 41 functions as an image signal converter for converting monochromatic image data 51, which has been received from the monochromatic image sensor 24, into second luminance information 53. The monochromatic signal converter 41 acquires the second luminance information 53 by calculating the monochromatic image data 51, alternatively, the monochromatic image data 51 may be used as the second luminance information 53 as it is.

The color signal separator 42 functions as an image signal separator for separating RAW image data 52 which has been received from the color image sensor 23, into first luminance information 54 and color information 55. Incidentally, the first luminance information 54 and the second luminance information 53 correspond to luminance components in, for example, a YUV color space. The color information 55 is information on a color difference in the YUV color space.

FIGS. 8 and 9 are diagrams explanatory of the generation of the first luminance information in the color signal separator. In the color signal separator 42, a signal value of a G component, for example, is set as the first luminance information 54. In the color signal separator 42, as for an R pixel and a B pixel, the signal value of the G component is calculated by interpolating the signal value detected by G pixels arranged therearound.

The color signal separator 42 refers to signal values detected by four G pixels contained in a 3×3 pixel block centering the B pixel in calculating the signal value of the G component with respect to the B pixel, as illustrated in, for example, FIG. 8. The color signal separator 42 calculates the signal value of the G component with respect to the B pixel in accordance with an equation below, wherein "G1", "G2", "G3", and "G4" represent signal values of the G components detected by G pixels (G1, G2, G3, and G4) illustrated in FIG. 8, respectively.

(Signal value of $G$ component)=$(G1+G2+G3+G4)/4$

The color signal separator 42 refers to signal values detected by four G pixels contained in a 3×3 pixel block centering the R pixel in calculating the signal value of the G component with respect to the R pixel, as illustrated in, for example, FIG. 9. The color signal separator 42 calculates the signal value of the G component with respect to the R pixel in accordance with the same equation as that for the B pixel. Incidentally, the technique for the interpolation by the color signal separator 42 may be appropriately modified. For example, the color signal separator 42 may generate the first luminance information 54 by the technique of the demosaicing.

The image pickup processing circuit 20 temporarily stores in, for example, the frame memory 26 (see FIG. 3), the first luminance information 54 output from the color signal separator 43 and the second luminance information 53 output from the monochromatic signal converter 41. The parallax amount calculator 43 calculates the parallax amount of a luminance image (a first image) acquired by the color image sensor 23 and another luminance image (a second image) acquired by the monochromatic image sensor 24 by using the first luminance information 54 and the second luminance information 53 which have been read from the frame memory 26. The parallax amount calculator 43 converts a deviation of a luminance image based on the second luminance information 53 into the number of pixels with reference to, for example, a luminance image based on the first luminance information 54, and then, uses it as parallax amount.

The parallax amount calculator 43 adopts the technique of, for example, block matching, so as to readily calculate a deviation between the luminance images. Moreover, the parallax amount calculator 43 produces a depth map based on the calculated parallax amount. Here, the parallax amount calculator 43 calculates the parallax amount with reference to the luminance image based on the first luminance information 54, alternatively, it may calculate the parallax amount with reference to the luminance image based on the second luminance information 53. In this case, the image pickup processing circuit 20 subjects also the color information 55 to the parallax correction in the same manner as the first luminance information 54. In this manner, the image pickup processing circuit 20 can acquire a synthetic image whose parallax has been corrected.

The parallax corrector 44 is adapted to correct the parallax of the luminance image acquired by the color image sensor 23 and the parallax of the luminance image acquired by the monochromatic image sensor 24. The parallax corrector 44 corrects the parallax with reference to the depth map produced by the parallax amount calculator 43. The luminance information synthesizer 45 synthesizes the first luminance information 54 and the second luminance information 53 which have been subjected to the parallax correction in the parallax corrector 44, thereby producing synthesized luminance information 56.

The resolution restorer 46 restores a resolution of a synthesized image based on the synthesized luminance information 56. The resolution restorer 46 presumes lens characteristics such as blur amount which is caused by the first image pickup lens 21 and the second image pickup lens 22, and then, restores the resolution based on the presumed lens characteristics. The lens characteristics include, for example, a point spread function (abbreviated as a "PSF"). The PSF is presumed by, for example, a minimum square method. The effect of the resolution restoration depends on algorism for use in the restoration. The resolution restorer 46 uses, for example, the Richardson-Lucy method in order to restore an image similar to an original object image.

The camera module 10 previously holds individual information such as a fabrication error and the lens characteristics about each of the first image pickup lens 21, the second image pickup lens 22, the color image sensor 23, and the monochromatic image sensor 24 in order to obtain a secure effect of the resolution restoration. The individual information is stored in, for example, an OTP (abbreviating "one time programmable memory", not shown) inside of the solid-state imaging device 12 or the ISP 13.

The LPF 47 functions as a smoother for smoothing the color information 55 output from the color signal separator 42. The LPF 47 smoothes the color information 55 so as to reduce a color noise. Here, the image pickup processing circuit 20 may subject the color information 55 to, for example, noise reduction in place of the smoothing by the LPF 47.

The image synthesizer 48 synthesizes the synthesized luminance information 56 which has been subjected to the resolution restoration by the resolution restorer 46 with the color information 55 which has been subjected to the smoothing by the LPF 47, thereby producing synthetic image data 57. The image pickup processing circuit 20 outputs the synthetic image data 57 produced in the image synthesizer 48.

The solid-state imaging device 12 can acquire the second luminance information 53 having an outline component of a high signal-to-noise ratio (abbreviated as "SNR") and a high resolution by the monochromatic image sensor 24. Since the clear outline component can be acquired from the second luminance information 53, the image pickup processing circuit 20 may extract the color information 55 by higher priority than the first luminance information 54 in the color signal separator 42 with respect to the RAW image data 52 output from the color image sensor 23. The image pickup processing circuit 20 can acquire the high sensitivity with respect to not only the outline component but also the color component.

Incidentally, the image pickup processing circuit 20 is not limited to the use in converting, into the color information 55, the synthesized luminance information 56 obtained by synthesizing the first luminance information 54 and the second luminance information 53 by the luminance information synthesizer 45. The image pickup processing circuit 20 may synthesize the second luminance information 53 derived from the monochromatic image sensor 24 with the color information 55. Also in this case, the image pickup processing circuit 20 can acquire the high sensitivity of not only the outline component but also the color component.

In the solid-state imaging device 12 in the present embodiment, the color image sensor 23 and the monochromatic image sensor 24 acquire the pieces of luminance information 53 and 54 and the color information 55. In the image pickup processing circuit 20, the luminance information synthesizer 45 synthesizes the second luminance information 53 from the W pixel having a higher sensitivity than those of the other color pixels with the first luminance information 54 from the other color pixels, thus achieving the synthesized image having a high sensitivity. Moreover, the image pickup processing circuit 20 synthesizes the color information 55 acquired by the color image sensor 23, so that the solid-state imaging device 12 can secure a high color reproducibility.

The solid-state imaging device 12 can suppress degradation of color reproducibility caused by a crosstalk in comparison with the case of the use of the image sensor for the W pixel arranged in the other color pixels in combination. Moreover, the solid-state imaging device 12 can suppress degradation of sensitivity of each of the color components caused by the saturation of the output of the W pixel prior to the other color pixels.

As described above, the solid-state imaging device 12 synthesizes the information acquired by the color image sensor 23 and the monochromatic image sensor 24, thereby picking up the image with the high sensitivity and the high color reproducibility. In this manner, the camera module 10 can form the image having a high resolution and a high precision. Additionally, the camera module 10 dispenses with magnification of the pixel for the high sensitivity or sureness of a long focal distance, thus achieving a decrease in thickness and size.

At least a part of the elements provided for the image pickup processing circuit 20 illustrated in FIG. 7 may be disposed in the signal processing circuit 33 in the ISP 13. Moreover, the image pickup processing circuit 20 may perform at least a part of the processing illustrated in FIG. 4 to be performed by the signal processing circuit 33. The solid-state imaging device 12 may appropriately omit the frame memory 26 according to the arrangement of the image pickup processing circuit 20 and the signal processing circuit 33.

FIG. 10 is a table explanatory of a modification in which the synthesized luminance information is acquired by synthesizing the first luminance information and the second luminance information. In the table, Type 1 shows the mode which has been described in the present embodiment. In Type 1, the solid-state imaging device 12 includes the monochromatic image sensor 24 in which the W pixels are juxtaposed, and the color image sensor 23 in which the pixels of RGB colors are arranged in the Bayer matrix. The second luminance information 53 is acquired from the monochromatic image data 51 consisting of the signal values of the W components. The first luminance information 54 is the signal value of the G component acquired through the interpolation of the RAW image data 52 consisting of the signal values of the RGB components.

In the monochromatic image sensor 24, the W pixels may be replaced with the array of gray pixels, which are adapted to detect a gray scale. The image pickup processing circuit 20 may subject the gray pixels to the same signal processing as that with respect to the W pixels.

In Type 2, the solid-state imaging device 12 uses the monochromatic image sensor 24 in which the G pixels are juxtaposed, and the same color image sensor 23 as that in Type 1. The second luminance information 53 is the signal value of the G component. The first luminance information 54 is the signal value of the G component acquired through the interpolation.

FIG. 11 is a diagram explanatory of a matrix of pixels in the color image sensor used in Type 3. In Type 3, the color image sensor 23 in which the R and B pixels are alternately juxtaposed is used. The solid-state imaging device 12 uses the color image sensor 23 and the same monochromatic image sensor 24 as that in Type 2. The second luminance information 53 is the signal value of the G component in the same manner as that in Type 2.

The color signal separator 42 (see FIG. 7) acquires the signal value of the R component and the signal value of the B component with respect to each of the pixels by interpolating the image data consisting of the signal values of the R and B components. The color signal separator 42 acquires a signal value of M (magenta) component by adding the signal value of the R component and the signal value of the B component. In Type 3, the signal value of the M component becomes the first luminance information 54.

FIG. 12 is a diagram explanatory of a matrix of pixels in the color image sensor used in Type 4. In Type 4, the color image sensor 23 in which CY (C: cyan; and Y: yellow) pixels are alternately juxtaposed is used. The solid-state imaging device 12 uses the color image sensor 23 and the same monochromatic image sensor 24 as that in Type 2. The second luminance information 53 is the signal value of the G component in the same manner as that in Type 2. The color signal separator 42 acquires a signal value of a C component and a signal value of a Y component with respect to each of pixels by interpolating image data consisting of the signal values of the C and Y components.

FIG. 13 is a diagram explanatory of calculation of the signal value of the C component with respect to the Y pixel. The color signal separator 42 refers to, for example, signal values detected by the four C pixels included in a 3×3 pixel block centering the Y pixel. The color signal separator 42 calculates the signal value of the C component with respect to the Y pixel in accordance with, for example, an equation below, wherein "C1", "C2", "C3", and "C4" represent signal values of the C component detected by C pixels (C1, C2, C3, and C4) illustrated in FIG. 13, respectively.

(Signal value of $C$ component)=$(C1+C2+C3+C4)/4$

FIG. 14 is a diagram explanatory of calculation of the signal value of the Y component about the C pixel. The color signal separator 42 refers to, for example, signal values detected by the four Y pixels included in a 3×3 pixel block centering the C pixel. The color signal separator 42 calculates the signal value of the Y component with respect to the C pixel in accordance with an equation below, wherein "Y1", "Y2", "Y3", and "Y4" represent signal values of the Y component detected by Y pixels (Y1, Y2, Y3, and Y4) illustrated in FIG. 14, respectively.

(Signal value of $Y$ component)=$(Y1+Y2+Y3+Y4)/4$

The color signal separator 42 acquires the signal value of the G component by adding the signal value of the C component and the signal value of the Y component which have been subjected to the interpolation. In Type 4, the signal value of the G component becomes the first luminance information 54. In the case of any one of Types 1 to 4, the solid-state imaging device 12 can pick up the image with the high sensitivity and the high color reproducibility.

Figure 15:
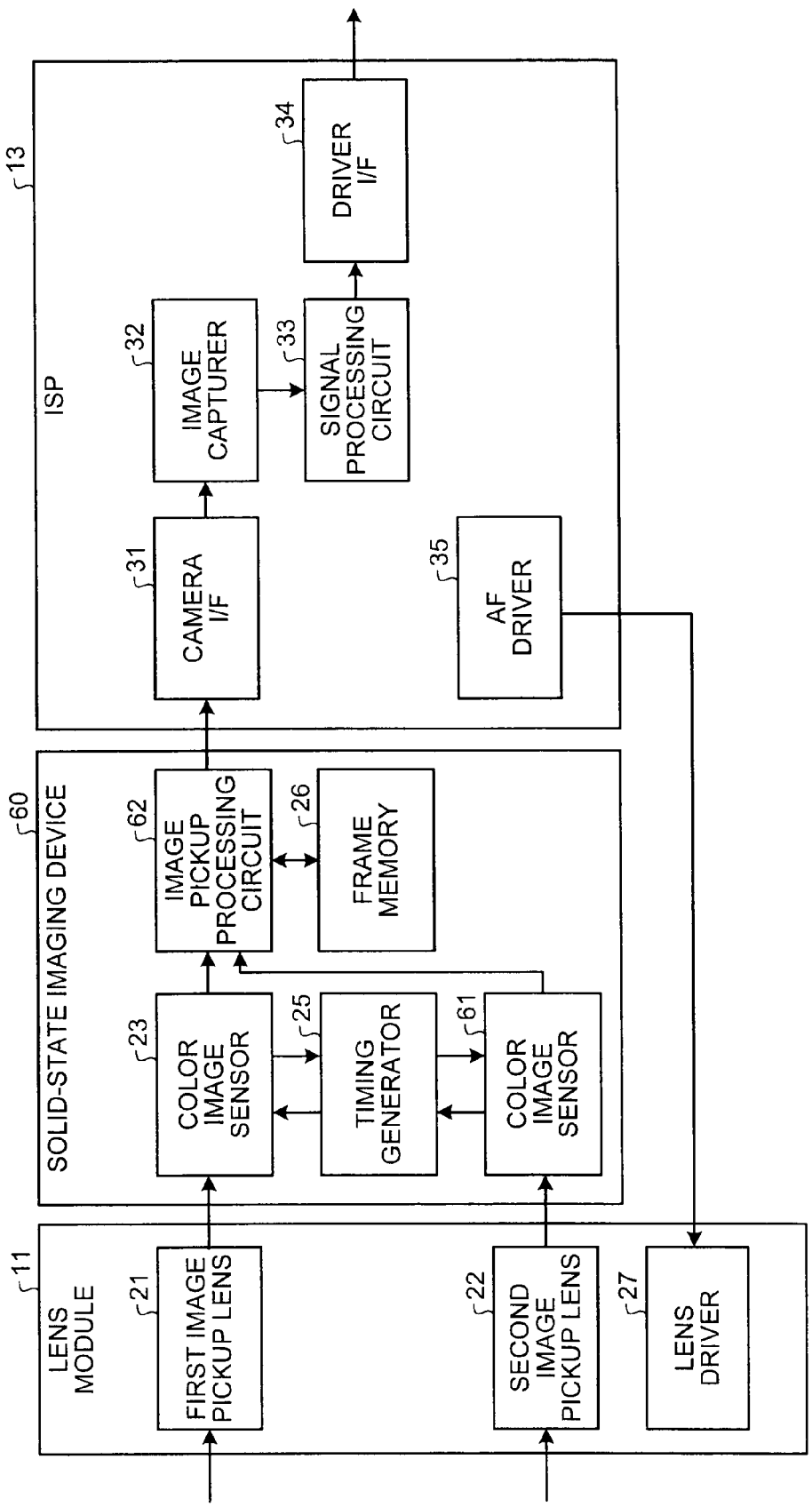
FIG. 15 is a block diagram illustrating the partial configuration of a camera module including a solid-state imaging device in a modification in the embodiment.

FIG. 15 is a block diagram illustrating the partial configuration of a camera module including a solid-state imaging device in a modification in the embodiment. A solid-state imaging device 60 in the present modification includes a color image sensor 61 as a second image sensor in place of the monochromatic image sensor 24 illustrated in FIG. 3. The color image sensor 61 is designed to detect a plurality of color lights.

Figure 16:
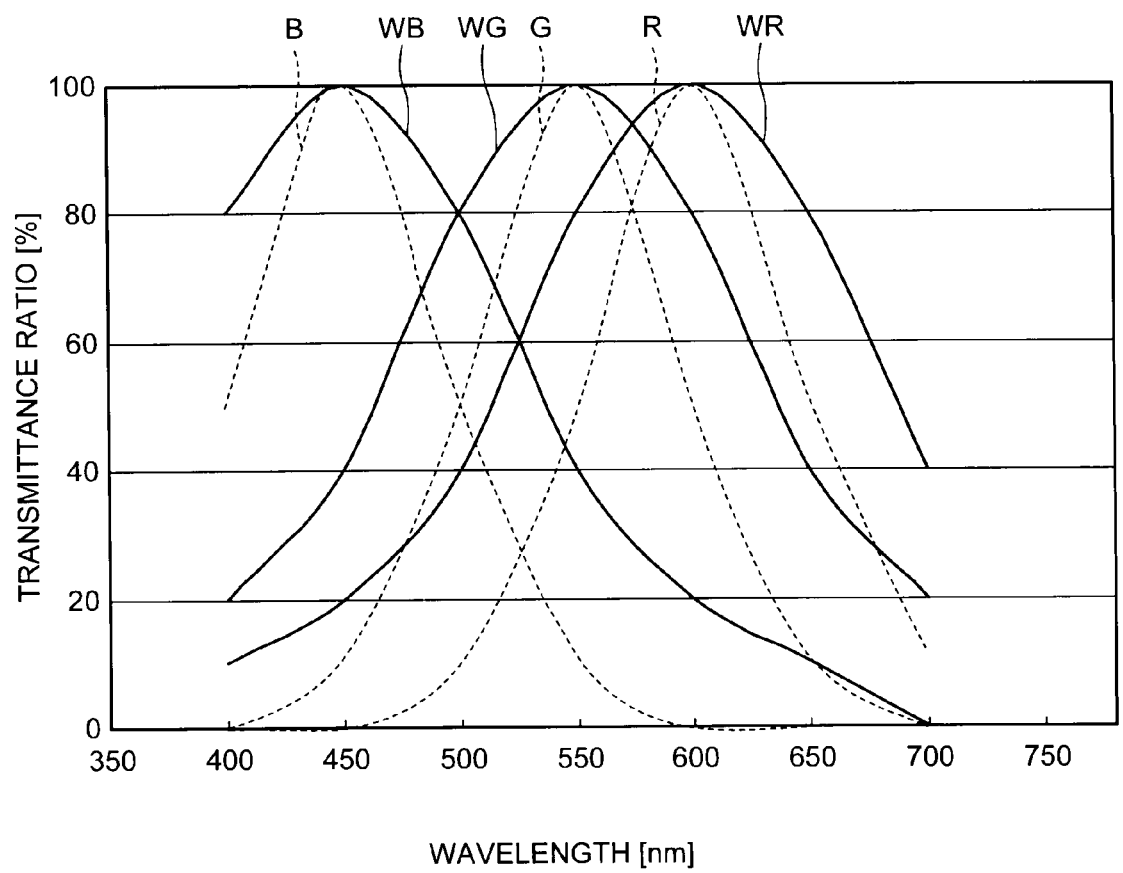
FIG. 16 is a graph illustrating transmittance characteristics of color filters disposed in color pixels for comparison with respect to first and second image sensors.

FIG. 16 is a graph illustrating transmittance characteristics of color filters disposed in color pixels for comparison with respect to first and second image sensors. A color image sensor 23 serving as the first image sensor includes R, G, and B pixels. The R pixel has a color filter which selectively transmits an R light. The G pixel has a color filter which transmits a G light. The B pixel has a color filter which transmits a B light.

A color image sensor 61 serving as the second image sensor includes wider red (WR) pixels, wider green (WG) pixels, and wider blue (WB) pixels. The WR pixel has a color filter which selectively transmits a WR light which has substantially the same peak wavelength as that of the R light and has a wider wavelength region than that of the R light. The WG pixel has a color filter which transmits a WG light which has substantially the same peak wavelength as that of the G light and has a wider wavelength region than that of the G light. The WB pixel has a color filter which transmits a WB light which has substantially the same peak wavelength as that of the B light and has a wider wavelength region than that of the B light.

The wavelength region of each of the color lights to be detected by the color image sensor 61 is set wider than that of each of the color lights to be detected by the color image sensor 23. The WR, WG, and WB pixels are arrayed in, for example, the Bayer matrix in the color image sensor 61. The color image sensor 61 outputs RAW image data as a second image signal.

Each of the WR, WG, and WB color filters disposed in the color image sensor 61 transmits a light in a wider wavelength region by, for example, about 50 nm to about 100 nm at a transmittance ratio of 50% than each of the R, G, and B color filters disposed in the color image sensor 23. Each of the WR, WG, and WB pixels in the color image sensor 61 detects a light in the wider wavelength region than each of the R, G, and B pixels in the color image sensor 23, thereby achieving a higher sensitivity.

Figure 17:
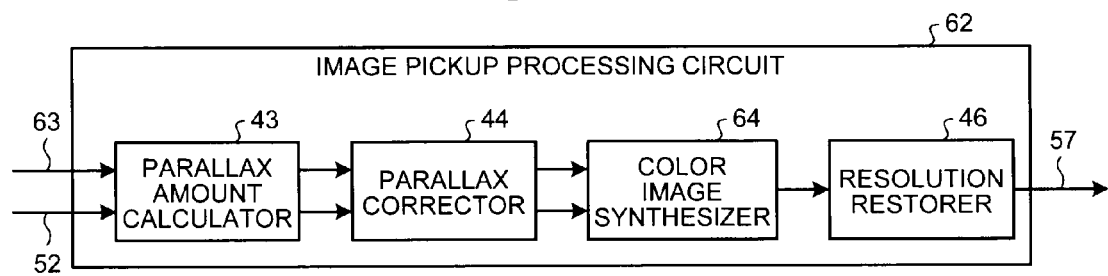
FIG. 17 is a block diagram illustrating an image pickup processing circuit to be applied to the modification in the embodiment.

FIG. 17 is a block diagram illustrating an image pickup processing circuit to be applied to the modification in the embodiment. An image pickup processing circuit 62 includes a parallax amount calculator 43, a parallax corrector 44, a color image synthesizer 64, and a resolution restorer 46.

The parallax amount calculator 43 calculates the parallax amount of a first RAW image acquired by the color image sensor 23 and a second RAW image acquired by the color image sensor 61 by using RAW image data 52 received from the color image sensor 23 and RAW image data 63 received from the color image sensor 61. The parallax amount calculator 43 converts a deviation of the second RAW image into the number of pixels with reference to the first RAW image, so as to obtain the parallax amount.

The parallax corrector 44 corrects a parallax between the first RAW image and the second RAW image. The color image synthesizer 64 is adapted to synthesize the RAW image data 52 and 63 through the parallax correction in the parallax corrector 44. The resolution restorer 46 restores the resolution of a synthesized image produced by the color image synthesizer 64. The image pickup processing circuit 62 outputs synthesized image data 57 through the resolution restoration in the resolution restorer 46.

The image pickup processing circuit 62 synthesizes the RAW image data 63 output from each of the WR, WG, and WB pixels having a higher sensitivity than that of each of the R, G, and B pixels with the RAW image data 52 output from each of the R, G, and B pixels, thereby forming a synthesized image having a higher sensitivity. Consequently, the solid-state imaging device 60 secures a high color reproducibility owing to the synthesis of the RAW image data 52 and 63. In this manner, the solid-state imaging device 60 in the present modification also can pick up the image with the high sensitivity and the high color reproducibility.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
a first image sensor configured to output a first image signal according to an intensity distribution of each of color lights from an object;
a second image sensor configured to output a second image signal according to a luminance distribution of the light from the object; and
an image pickup processing circuit configured to process the first image signal and the second image signal, wherein
the image pickup processing circuit includes
an image signal separator configured to separate the first image signal which has been received from the first image sensor, into color information and first luminance information,
a luminance information synthesizer configured to synthesize the first luminance information and second luminance information included in the second image signal with each other so as to produce synthesized luminance information,
an image synthesizer configured to synthesize the color information output from the image signal separator and the synthesized luminance information produced by the luminance information synthesizer with each other so as to produce synthetic image data,
a parallax amount calculator configured to calculate parallax amount of a first image acquired by the first image sensor and a second image acquired by the second image sensor, and
a parallax corrector configured to correct a parallax between the first image and the second image, and
the parallax amount calculator calculates the parallax amount by using the first luminance information output from the image signal separator and the second luminance information, and
the luminance information synthesizer synthesizes the first luminance information and the second luminance information output from the parallax corrector with each other.

2. The solid-state imaging device according to claim 1, wherein the image pickup processing circuit further includes:
an image signal converter configured to convert the second image signal which has been received from the second image sensor, into the second luminance information, and
the luminance information synthesizer synthesizes the second luminance information output from the image signal converter and the first luminance information with each other.

3. The solid-state imaging device according to claim 1, wherein the image pickup processing circuit further includes a resolution restorer configured to restore a resolution of a synthesized image based on the synthesized luminance information, and
the image synthesizer synthesizes the color information with the synthesized luminance information through the resolution restoration.

4. The solid-state imaging device according to claim 1, wherein the image pickup processing circuit further includes a smoother configured to smooth the color information output from the image signal separator, and
the image synthesizer synthesizes the synthesized luminance information with the color information through the smoothing.

5. The solid-state imaging device according to claim 1, wherein the image signal separator extracts the color information in higher priority than the first luminance information from the first image signal.

6. The solid-state imaging device according to claim 1, further comprising a frame memory configured to store at least either one of the first image signal and the second image signal, wherein the first image sensor, the second image sensor, and the frame memory are mounted on a common board.

7. The solid-state imaging device according to claim 1, wherein the first image sensor is a color image sensor configured to detect a plurality of color lights, and
the second image sensor is a monochromatic image sensor configured to detect a single color light.

8. The solid-state imaging device according to claim 7, wherein the monochromatic image sensor has a white pixel configured to detect a white light.

9. The solid-state imaging device according to claim 7, wherein the monochromatic image sensor has a green pixel configured to detect a green light, and
the second luminance information is a signal value of a green component.

10. The solid-state imaging device according to claim 1, wherein both of the first image sensor and the second image sensor are a color image sensor for detecting a plurality of color lights, and
a wavelength region of each of the color lights to be detected by the second image sensor is set wider than that of each of the color lights to be detected by the first image sensor.

11. An image processing apparatus comprising:
an image signal separator configured to separate a first image signal according to an intensity distribution of each of color lights from an object into color information and first luminance information;
an image signal converter configured to convert a second image signal according to a luminance distribution of the light from the object into second luminance information;
a luminance information synthesizer configured to synthesize the first luminance information and the second luminance information output from the image signal converter with each other so as to produce synthesized luminance information;
an image synthesizer configured to synthesize the color information output from the image signal separator and the synthesized luminance information produced in the luminance information synthesizer with each other so as to produce synthetic image data,
a parallax amount calculator configured to calculate parallax amount of a first image based on the first image signal and a second image based on the second image signal; and
a parallax corrector configured to correct a parallax between the first image and the second image, wherein
the parallax amount calculator calculates the parallax amount by using the first luminance information output from the image signal separator and the second luminance information, and
the luminance information synthesizer synthesizes the first luminance information and the second luminance information output from the parallax corrector with each other.

12. The image processing apparatus according to claim 11, further comprising a smoother configured to smooth the color information output from the image signal separator, wherein the image synthesizer synthesizes the synthesized luminance information with the color information through the smoothing.

13. A camera module comprising:
a lens module configured to capture light from an object so as to form an image of the object; and
a solid-state imaging device configured to pick up the image of the object, wherein
the solid-state imaging device includes:
a first image sensor configured to output a first image signal according to an intensity distribution of each of color lights from the object;
a second image sensor configured to output a second image signal according to a luminance distribution of the light from the object; and
an image pickup processing circuit configured to process the first image signal and the second image signal, wherein
the image pickup processing circuit includes
an image signal separator configured to separate the first image signal which has been received from the first image sensor, into color information and first luminance information,
a luminance information synthesizer configured to synthesize the first luminance information and second luminance information included in the second image signal with each other so as to produce synthesized luminance information,
an image synthesizer configured to synthesize the color information output from the image signal separator and the synthesized luminance information produced by the luminance information synthesizer with each other so as to produce synthetic image data,
a parallax amount calculator configured to calculate parallax amount of a first image based on the first image signal and a second image based on the second image signal, and
a parallax corrector configured to correct a parallax between the first image and the second image, wherein the parallax amount calculator calculates the parallax amount by using the first luminance information output from the image signal separator and the second luminance information, and
the luminance information synthesizer synthesizes the first luminance information and the second luminance information output from the parallax corrector with each other.

14. The camera module according to claim 13, wherein the lens module includes:
a first image pickup lens configured to capture light from the object to enter the first image sensor;
a second image pickup lens configured to capture light from the object to enter the second image sensor; and
a lens driver configured to adjust the focuses of the first image pickup lens and the second image pickup lens, and
the lens driver drives the first image pickup lens and the second image pickup lens.

15. The camera module according to claim 14, wherein the first image pickup lens and the second image pickup lens are held by a common lens holder; and
the lens driver moves the lens holder so as to drive the first image pickup lens and the second image pickup lens together.

16. The camera module according to claim 13, wherein the solid-state imaging device includes a frame memory configured to store at least either one of the first image signal and the second image signal, and
the first image sensor, the second image sensor, and the frame memory are mounted on a common board.

17. The camera module according to claim 13, wherein the image pickup processing circuit further includes a resolution restorer configured to restore a resolution of a synthesized image based on the synthesized luminance information, and
the resolution restorer restores the resolution based on individual information previously held in the camera module.

* * * * *